(12) United States Patent
Xie et al.

(10) Patent No.: US 11,353,051 B2
(45) Date of Patent: Jun. 7, 2022

(54) KIND OF OUTDOOR FURNITURE WITH A NON-WELDED AND QUICK-INSTALLED STRUCTURE

(71) Applicant: Yotrio Group Co., Ltd., Linhai (CN)

(72) Inventors: Jian Qiang Xie, Linhai (CN); Ding Wang, Linhai (CN)

(73) Assignee: Yotrio Group Co., Ltd., Zhejiang (CN)

( * ) Notice: Subject to any disclaimer, the term of this patent is extended or adjusted under 35 U.S.C. 154(b) by 335 days.

(21) Appl. No.: 16/554,621

(22) Filed: Aug. 29, 2019

(65) Prior Publication Data
US 2020/0248852 A1    Aug. 6, 2020

(30) Foreign Application Priority Data
Jan. 31, 2019  (CN) .......................... 201920174346.1

(51) Int. Cl.
*F16B 12/44*  (2006.01)
*F16B 12/50*  (2006.01)
*F16L 37/02*  (2006.01)

(52) U.S. Cl.
CPC .............. *F16B 12/44* (2013.01); *F16B 12/50* (2013.01); *F16L 37/025* (2013.01)

(58) Field of Classification Search
CPC ................ F16B 2012/443; F16B 12/44; F16B 2012/446; F16B 12/50
See application file for complete search history.

(56) References Cited

U.S. PATENT DOCUMENTS

| | | | | |
|---|---|---|---|---|
| 3,532,369 A | * | 10/1970 | Frederick | F16B 7/0446 403/176 |
| 3,883,257 A | * | 5/1975 | Delafield | A47B 47/0008 403/172 |
| 4,516,376 A | * | 5/1985 | King | A47B 47/0008 403/171 |
| 4,770,560 A | * | 9/1988 | Ott | A47B 47/0008 403/296 |
| 7,883,288 B2 | * | 2/2011 | Jorna | F16B 7/0486 403/171 |
| 2005/0202393 A1 | * | 9/2005 | Morgan | A47C 31/00 434/365 |
| 2011/0241502 A1 | * | 10/2011 | Kao | F16B 12/52 312/111 |
| 2015/0335151 A1 | * | 11/2015 | Funfgeld | F16B 12/14 403/205 |
| 2018/0209460 A1 | * | 7/2018 | Lin | F16B 12/40 |

FOREIGN PATENT DOCUMENTS

FR        2545163 A1 * 11/1984 ........... A63H 33/105

* cited by examiner

*Primary Examiner* — James M Hewitt, II
(74) *Attorney, Agent, or Firm* — Jingming (James) Cai; SAC Attorneys LLP

(57) ABSTRACT

This utility model discloses a kind of outdoor furniture with a non-welded and quick-installed structure, including a furniture body, is characterized in that the connection of each pipe of the furniture body mentioned is realized through the interference fit between the fittings and adjacent pipes. The utility model eliminates the welding and polishing processes and simplifies the assembly process through the interference fit of the two-coupling, three-coupling and four-coupling fittings with pipes for the early stage brackets, greatly saving the labor cost and production cost.

8 Claims, 4 Drawing Sheets

KIND OF OUTDOOR FURNITURE WITH A NON-WELDED AND QUICK-INSTALLED STRUCTURE

CROSS REFERENCE TO RELATED APPLICATIONS

This application claims priority to and benefit of the utility model patent application number 201920174346.1 titled "A kind of outdoor furniture with a non-welded and quick-installed structure", filed on Jan. 31, 2019 in the National Intellectual Property Administration of the People's Republic of China. The specifications of the above referenced patent applications are incorporated herein by reference in their entirety.

FIELD OF THE INVENTION

The utility model belongs to the technical field of outdoor furniture parts, which particularly relates to a kind of outdoor furniture with a non-welded and quick-installed structure.

BACKGROUND

Outdoor furniture such as chairs, sofas, cabinets, beds and so on, for a variety of different needs, are usually made of rattan or cloth. The early stage brackets of products of this kind are finished through welding, polishing and spraying of sections before rattan weaving or cloth covering. This kind of production technology has cumbersome processes, making the production cost greatly increase. The production processes of welding and polishing require relatively large labor costs and will prolong the circulation cycle of the workshop.

SUMMARY OF THE INVENTION

In view of the existing problems in the existing technology, the utility model is designed to provide a kind of outdoor furniture with a non-welded and quick-installed structure.

The utility model is realized through the following technical scheme:

A kind of outdoor furniture with a non-welded and quick-installed structure, including a furniture body, is characterized in that the connection of each pipe of the furniture body mentioned is realized through the interference fit between the fittings and adjacent pipes.

A kind of outdoor furniture with a non-welded and quick-installed structure mentioned is characterized in that the fittings include connecting blocks and connector clips arranged on different faces of connecting blocks. The barbed splicing pieces are arranged around the connector clips mentioned, and the outer side of connector clips is arranged with splicing pieces.

A kind of outdoor furniture with a non-welded and quick-installed structure is characterized in that the splicing pieces mentioned are arranged along the radial direction outwardly, with a barbed sheet or a vertical sheet-like structure.

A kind of outdoor furniture with a non-welded and quick-installed structure is characterized in that the fittings mentioned are provided in an integrated way.

A kind of outdoor furniture with a non-welded and quick-installed structure is characterized in that the outer edge of the barbed splicing pieces mentioned has interference fit with splicing pipes.

A kind of outdoor furniture with a non-welded and quick-installed structure is characterized in that the fittings mentioned are two-coupling, three-coupling or four-coupling.

A kind of outdoor furniture with a non-welded and quick-installed structure is characterized in that the connecting blocks are in the form of blocks or strips.

A kind of outdoor furniture with a non-welded and quick-installed structure mentioned is characterized in that the connector clips on the same end of the connecting blocks are arranged perpendicular to each other.

A kind of outdoor furniture with a non-welded and quick-installed structure is characterized in that the outdoor furniture comprises chair, bed and cabinet.

The utility model eliminates the welding and polishing processes and simplifies the assembly process through the interference fit of the two-coupling, three-coupling and four-coupling fittings with pipes for the early stage brackets, greatly saving the labor cost and production cost.

DETAILED DESCRIPTION OF THE INVENTION

The following is a further detailed explanation of the utility model in combination with the accompanying drawings to the Specification, and the specific implementation method will be given.

Figure 1:
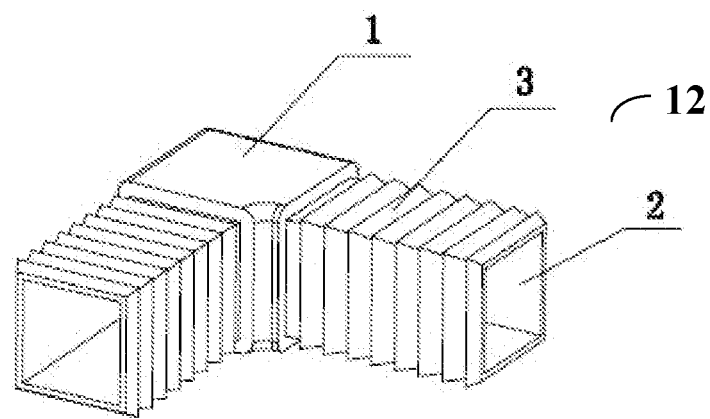
FIG. 1. Structure Diagram of the Two-coupling Fitting.
Figure 2:
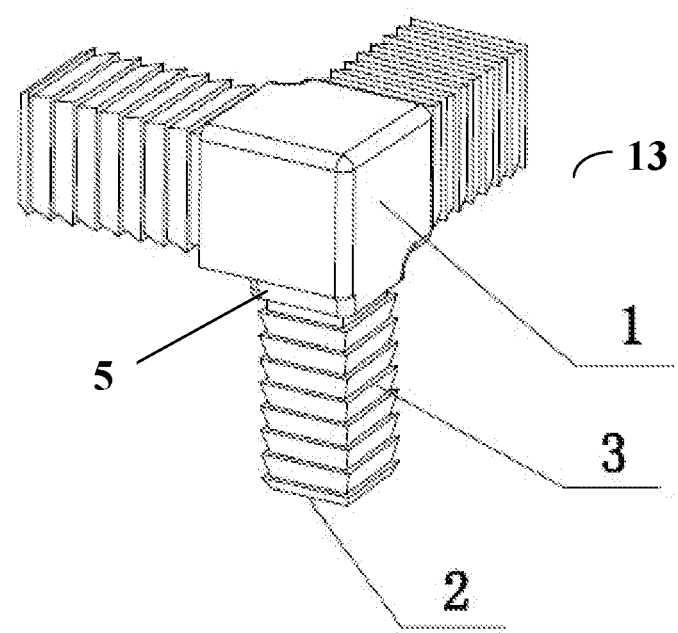
FIG. 2. Structure Diagram of the Three-coupling Fitting.
Figure 3:
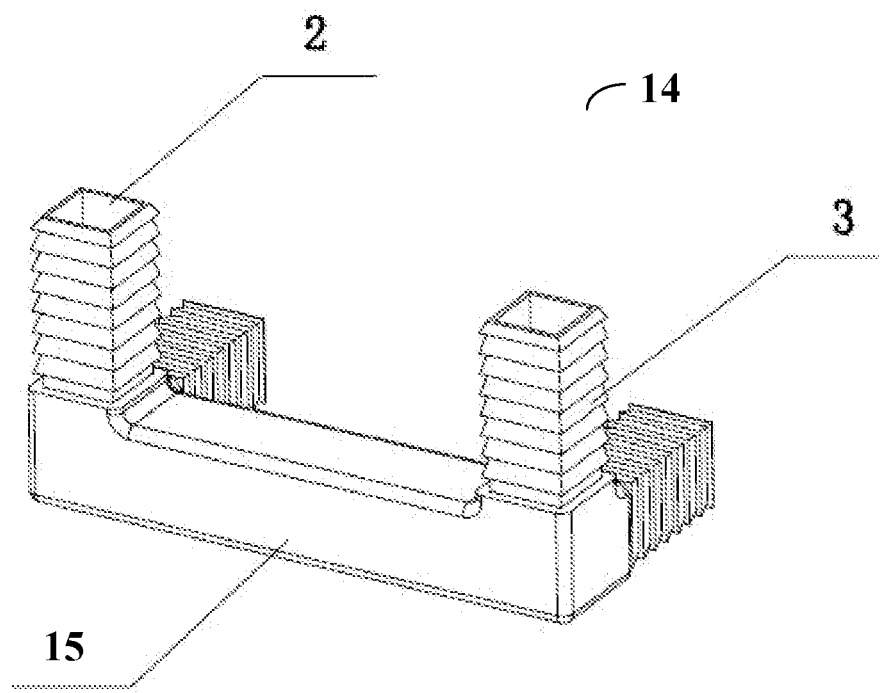
FIG. 3. Structure Diagram of the Four-coupling Fitting.

As shown in FIG. 1-3, the utility model—a kind of outdoor furniture with a non-welded and quick-installed structure, including a furniture body, is characterized in that the connection of each pipe of the furniture body is realized through the interference fit between the fittings and adjacent pipes. The connection structure is realized by fixing the fittings and pipes without welding or polishing, thus saving production cost and optimizing the structure of conventional outdoor furniture. Outdoor furniture can be chairs, cabinets, beds and other conventional products.

The fittings include: Integral connecting components in the form of blocks (1) or strips (15) and connector clips set on different faces of connecting blocks (1) or connector strips (15), which can be set on two faces, three faces or four faces. Therefore, the fittings can be two-coupling, three-coupling or four-coupling. The outer side of connector clips (5) is arranged with splicing pieces (2), and the splicing pieces are arranged along the radial direction outwardly. The outer edge (3) of the splicing pieces has an interference fit with splicing pipes (4). The different types of splicing pipes (4) include a long pipe (4a) and a short pipe (4b). The splicing pipes (4) have a barbed outer surface. The connector clips (5) on the same end of the connecting blocks (1) or connector strips (15) are arranged perpendicular to each other.

Embodiment 1

Figure 4:
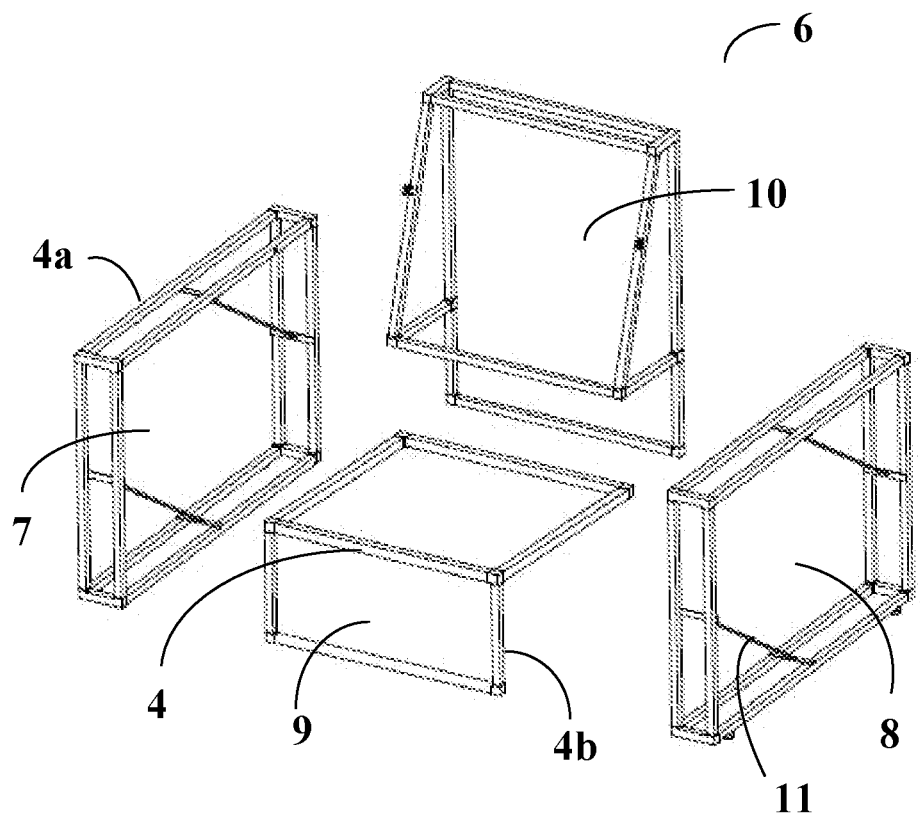
FIG. 4-6 are connection application diagrams of each fitting in a chair in embodiment 1.
In the figure, 1—connecting block, 2—connector clip, 3—barbed splicing piece.
Figure 5:
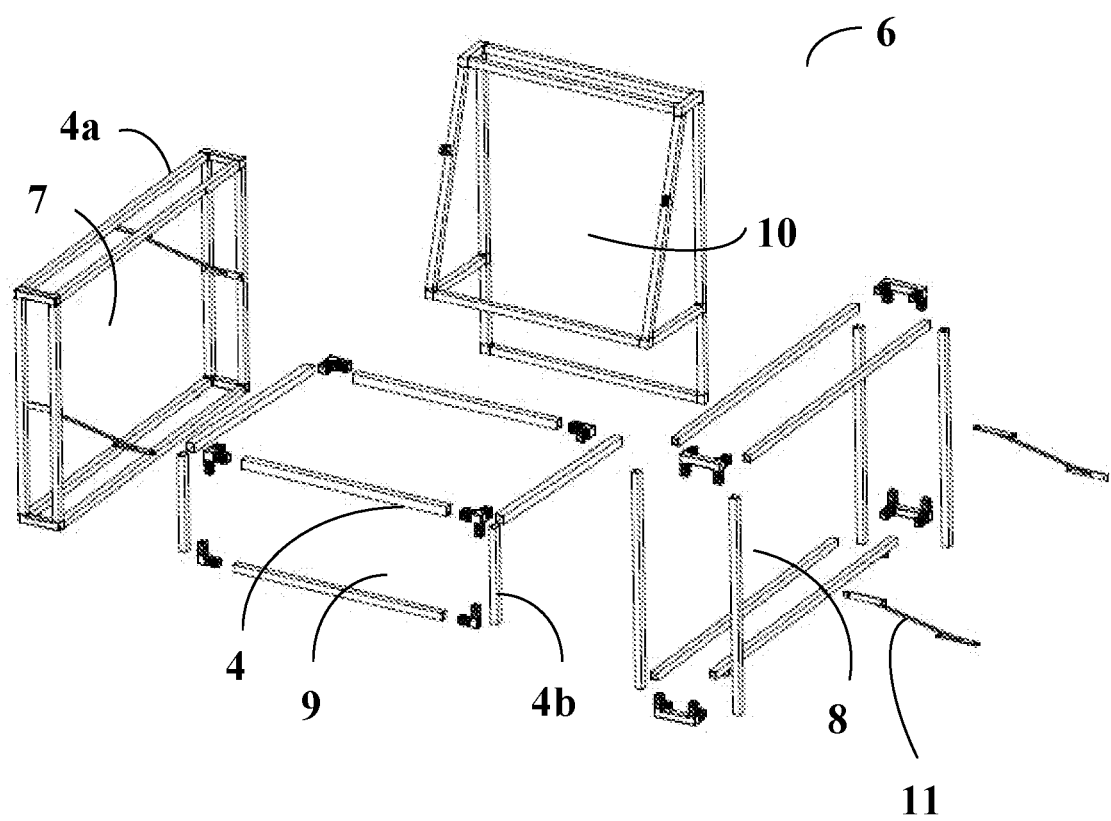
Figure 6:
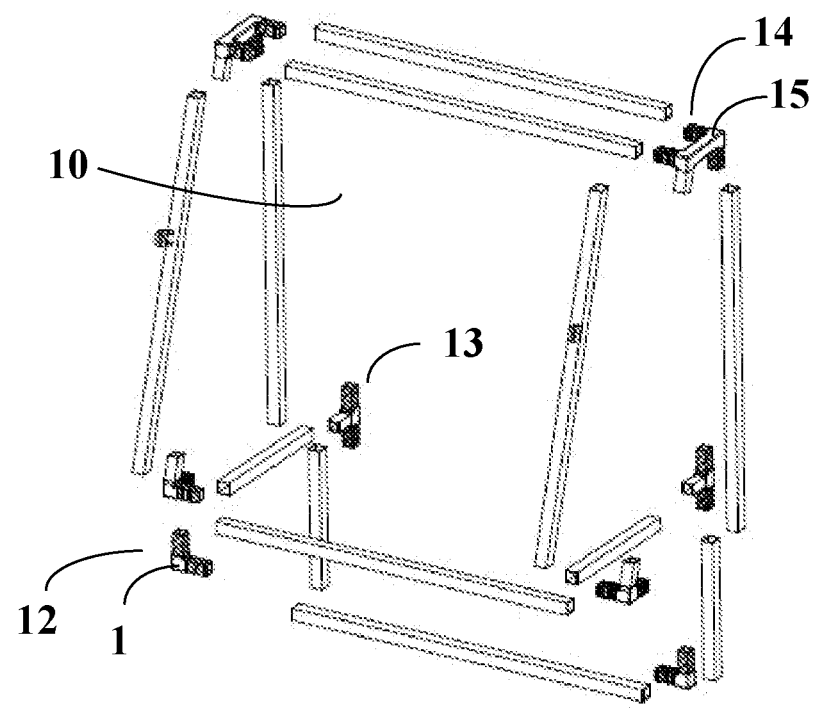

As shown in FIG. 4-6, the outdoor product in this embodiment is a chair (6), which is composed of left handrail component (7), right handrail component (8), seat component (9) and back component (10). The left (7) and right (8) handrail component components include tilted supports (11). The long pipes (4a) of the left (7) and right (8) handrail components are connected by four four-coupling fittings (14), and then the tilted support (11) is fixed with screw, making the handrail components (7, 8) not easy to deform. The long pipes (4a) and the short pipes (4b) of the seat component (9) are connected by three-coupling fittings (13). The long pipes (4a) and the short pipes (4b) of the back component (10) are connected by two-coupling fittings (12), three-coupling fittings (13), and four-coupling fittings (14). The chair structure (6) may be matched with environmentally friendly [PE] polyethylene (PE) simulation flat rattan, cloth covering products and so on.

We claim:

1. An outdoor furniture with a non-welded and quick-installed structure, comprising:

fittings and pipes;

said fittings comprising two-coupling fittings, three-coupling fittings, and four-coupling fittings, wherein said two-coupling fittings, said three-coupling fittings, and said four-coupling fittings comprise:

connecting blocks and connecting strips with connector clips attached to two faces, three faces, and four faces of said connecting blocks and connecting strips, wherein each of said connector clips comprise a proximal end and a distal end, and wherein said proximal ends of said connector clips are attached to said connecting blocks and connecting strips; and splicing pieces attached to said connector clips of said connecting blocks and said connecting strips at a distal end of said connector clips, wherein said splicing pieces are arranged radially outward from said connecting blocks and connecting strips, wherein outer edges of said splicing pieces are configured for fitting said pipes;

said pipes comprising long pipes and short pipes;

said outdoor furniture comprising a left handrail component, a right handrail component, a seat component, and back component, wherein said components of said outdoor furniture are formed by integrating said two-coupling fittings, said three-coupling fittings, and said four-coupling fittings with said pipes, wherein said long pipes are used to assemble said left handrail component, said right handrail component, said seat component and said back component, and wherein both of said long pipes and said short pipes are used to assemble said seat component and said back component;

said left handrail component and said right handrail component formed by connecting said pipes using said four-coupling fittings;

a tilted support fixed with a plurality of screws to each of said left handrail component and said right handrail component;

said seat component formed by connecting said pipes using said three-coupling fittings;

said back component formed by connecting said pipes using said two-coupling fitting, said three-coupling fittings, and said four-coupling fittings;

said pipes fitted to said connecting blocks and said connecting strips of said left handrail component, said right handrail component, and said seat component configured to be perpendicular to each other; and some of said pipes fitted to said connecting strips of said back component via said splicing pieces are configured to be perpendicular to each other, while some other of said pipes fitted to said connecting strips of said back component via said splicing pieces are configured to project outwardly at an angle with respect to each other.

2. The outdoor furniture with a non-welded and quick-installed structure, as described in claim 1, characterized in that the outdoor furniture comprises a chair.

3. The outdoor furniture with a non-welded and quick-installed structure, as described in claim 1, characterized in that said left handrail component and said right handrail component have a square cross-section.

4. The outdoor furniture with a non-welded and quick-installed structure, as described in claim 1, characterized in that said seat component has a rectangular cross-section.

5. The outdoor furniture with a non-welded and quick-installed structure, as described in claim 1, characterized in that said back component has an irregular shape.

6. The outdoor furniture with a non-welded and quick-installed structure, as described in claim 1, characterized in that said outdoor furniture is assembled by fixing said fittings and said pipes without welding or polishing.

7. The outdoor furniture with a non-welded and quick-installed structure, as described in claim 1, characterized in that said splicing pieces comprise a barbed outer surface.

8. The outdoor furniture with a non-welded and quick-installed structure, as described in claim 1, characterized in that said outdoor furniture is configured to be matched with environmentally friendly polyethylene simulation flat rattan and cloth covering products.

* * * * *